UNITED STATES PATENT OFFICE.

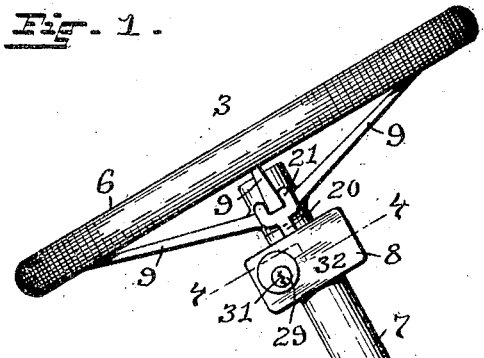

MICHAEL FISHER, OF PROVIDENCE, RHODE ISLAND.

STEERING-GEAR LOCK FOR MOTOR-VEHICLES.

1,262,656.   Specification of Letters Patent.   Patented Apr. 16, 1918.

Application filed July 30, 1917. Serial No. 183,606.

*To all whom it may concern:*

Be it known that I, MICHAEL FISHER, a citizen of the United States, residing at Providence, in the county of Providence and State of Rhode Island, have invented a new and useful Improvement in Steering-Gear Locks for Motor-Vehicles, of which the following is a specification.

When a motor vehicle is left unguarded, the heretofore usual means taken against theft such as removing the switch key, has been found to be of little use, as the thief, failing to drive the automobile off under its own power, by the use of well known expedients, will steal the automobile by towing the same away.

The object of my invention is to improve the construction of a steering gear lock for automobiles whereby, the front or steering wheels of the machine are turned at an angle relative to the machine and locked in that position, thereby preventing the theft of the machine by towing the machine away.

Further objects of my invention are to provide such a lock with means for locking the steering wheel to the steering post, with means for adjustably securing the lock to various sizes of steering posts, to improve the operation and to simplify and reduce the cost of construction.

My invention consists in the peculiar and novel construction of a steering gear lock for motor vehicles, said steering gear lock having details of construction, as will be more fully set forth hereinafter, and claimed.

Figure 1 is a side view of the steering wheel and upper portion of the steering post of an automobile, provided with my improved steering wheel lock and showing the same in the locked position.

Fig. 2 is an enlarged vertical sectional view of the lock, looking into the lock.

Fig. 3 is an enlarged vertical sectional view of the lock taken as indicated by line 3.3 of Fig. 1.

Fig. 4 is an enlarged transverse sectional view of the lock taken on line 4.4 of Fig. 1, and, Fig. 5 is a top view of the adjusting member removed from the lock.

In the drawing, 6 indicates the steering wheel and 7 the upper portion of an automobile steering post provided with my improved steering gear lock 8. The steering wheel 6 has the usual arms 9.9 and the steering post 7 is of the usual tubular construction and has the oppositely disposed small holes 10.10 as shown in Figs. 3 and 4.

The lock 8 consists of a box shaped frame 11 having a concaved back portion 12, recesses 13.13 in the back, a raised central portion 14 extending vertically through which is a rectangular shaped bore 15. The raised portion 14 also has a square transverse hole 16 into the bore 15 and, a parallel hole 17 intersecting a recess 18. A pin 19 on the back enters a hole 10 in the steering post 7. A locking bar 20 has a sliding fit in the bore 15, a U shaped upper end 21 and ratchet teeth 22 on its edge, as shown in Fig. 2. A locking bolt 23 has a sliding fit in the hole 16, a beveled end 24, engaging with the ratchet teeth 22, on the locking bar 20, a notch 25 in its underside, and a side arm 26 which enters the hole 17. Light and heavy whip springs 27 and 28 are secured at their lower ends to the frame 11, the free end of the light spring 27 bearing on the end of the locking bolt 23, and the free end of the heavy spring 28 being intermediate the free end of the spring 27 and the end of the frame 11, as shown in Fig. 2. A key operated member 29 has an arm 30 in the notch 25 in the locking bolt, and a key-hole 31 in its outer end. This key operated member 29 is supported at its inner end in a bearing in the back of the frame 11 and at its outer end in a bearing in a front plate 32, through which it extends flush with the face of the plate. The front plate 32 has a lug 33 on its back and in which is a hole 34. The lug 33 enters the recess 18 in the raised member 14 of the frame and the side arm 26 on the locking bolt 23 enters the hole 34 in the lug 33, thereby locking the front plate 32 to the frame 11 as shown in Fig. 4. A U shaped fastening member 35 goes around the steering post 7 and has a recess 36, a pin 37 and ends 38.38 adjustably secured in the recesses 13.13 in the back of the frame by the concealed screws 39.39 as shown in Fig. 4. A crescent shaped adjusting member 40 is shaped to fit into the fastening member 35 and around the steering post 7 and has an extension 41 fitting into the recess 36, a hole 42 in the extension for the pin 37, a recess 43, corresponding to the recess 36 and a pin 44 corresponding to the pin 37 and which enters the hole 10 in the steering post 7, as shown in Figs. 4 and 5.

The lock is supplied with the necessary number of adjusting members 40, each fitting within the other, for different sizes of steering posts. The pin 37 enters the hole 10 in the largest size steering post and one or more of the adjusting members are used for the smaller sizes of steering posts.

When in use my steering gear lock is rigidly and positively secured to the steering post of a motor vehicle by the pins 19 and 44 or 37 entering the holes 10.10, in the steering post, and the screws 39.39 which clamp the steering post between the back of the frame 11 and the fastening member 35. The front or steering wheels of the machine, not shown, are turned at an angle to the machine by the steering wheel 6 until a spoke 9 is over the lock 8. The locking bar 20 is now raised until the U shaped end 21 straddles a spoke 9 of the steering wheel, when the steering gear is automatically locked, by the locking bolt 23 engaging with a tooth of the ratchet teeth 22, and holding the locking bar 20 in the locked position. With the front or steering wheels of the machine now locked at an angle to the machine, it is impossible for a thief to steal the machine by towing the same away.

To unlock the steering gear, a key is inserted in the key hole 31 and turned to the left. This partly rotates the key member 29 and through the arm 30 moves the locking bolt 23 against the tension of the spring 27, out of engagement with the locking bar 20, which drops down by gravity, thereby unlocking the steering gear. When attaching or detaching the lock from the steering post, the key is turned still farther to the left, against the tension of the heavy spring 28, thereby entirely withdrawing the side arm 26 from the lug 33. The front plate 32 can now be removed for access to the concealed screws 39.39.

I do not wish to confine myself to the construction shown as the same could be varied within the scope of the appended claims.

Having thus described my invention I claim as new:

1. A steering gear lock for motor vehicles comprising a box shaped lock frame, a locking bar reciprocally supported in the frame and having a U-shaped upper end and ratchet teeth on its edge, a locking bolt engaging with the ratchet teeth, a key operated member engaging with the locking bolt, a light spring engaging with the locking bolt, a heavy spring adjacent the light spring, a front plate on the frame and having a lug on its back in which is a hole, an arm on the locking bolt entering the hole in the lug and means for adjustably securing the lock to the steering post of a motor vehicle, whereby a turning movement of the key operated member against the light spring will unlock the locking bolt and a further turning movement of the key operated member against both the light and heavy springs will unlock the front plate.

2. A steering gear lock for motor vehicles comprising a box shaped lock frame having an open front and a raised central portion in which is a bore, a transverse hole extending into the bore and a recess in the front, a locking bar in the bore, a locking bolt in the transverse hole and engaging with the locking bar, a front plate on the lock frame and having a lug in the recess in the raised central portion, a side arm on the locking bolt extending through a hole in the raised central portion and through a hole in the lug on the front plate, key operated means for operating the locking bolt and means for securing the lock to the steering post of a motor vehicle.

3. A steering gear lock for motor vehicles comprising a box shaped lock frame, a locking bar reciprocally supported in the lock frame, a locking bolt reciprocally supported in the frame and engaging with the locking bar, key operated means engaging with the locking bolt, a light whip spring secured to the frame and engaging with the locking bolt, a heavy whip spring secured to the frame intermediate the light whip spring and the frame, a front plate on the frame and having a lug on its back, a side arm on the locking bolt engaging with the lug on the front plate and means for securing the lock to the steering post of a motor vehicle.

4. A steering gear lock for motor vehicles comprising a box shaped lock frame having a curved recess and two adjacent recesses in the back, a raised central portion in which is a bore, a transverse hole entering the bore, a parallel transverse hole and a recess in the front intersecting the parallel transverse hole, a locking bar in the bore and having ratchet teeth, a locking bolt in the transverse hole and engaging with the ratchet teeth on the locking bar, key operated means engaging with the locking bolt, a light whip spring secured to the frame and engaging with the locking bolt, a heavy whip spring secured to the frame intermediate the light whip spring and the frame, a front plate on the frame and having a lug on its back and in which is a hole, a side arm on the locking bolt extending into the parallel hole in the raised central portion and through the hole in the lug on the front plate and means for securing the lock to the steering post of a motor vehicle.

5. A steering gear lock for motor vehicles comprising a box shaped lock frame having a central concaved back portion and two adjacent recesses in the back, a raised central portion in the frame and having a rectangular shaped bore, a square transverse hole entering the bore, a parallel hole and a recess in the front intersecting the parallel hole, a locking bar in the bore and having a U-shaped end and ratchet teeth on its edge, a locking bolt in the transverse hole and engaging with the ratchet teeth on the locking bar, a light whip spring secured to the frame and engaging with the locking bolt, a heavy whip spring secured to the frame intermediate the light whip spring and the frame, a front plate on the frame and having a lug on its back which enters the recess in the raised central portion, said lug having a hole coinciding with the parallel hole in the raised central portion, a side arm on the locking bolt extending into the parallel hole and through the hole in the lug, a key operated member having a bearing in the frame, a bearing in the front plate, a keyhole and an arm entering a notch in the locking bolt and means for securing the lock to the steering post of a motor vehicle.

In testimony whereof, I have signed my name to this specification.

MICHAEL FISHER.